June 7, 1932.    W. E. GREENAWALT    1,862,343
COPPER EXTRACTION PROCESS
Filed July 15, 1929
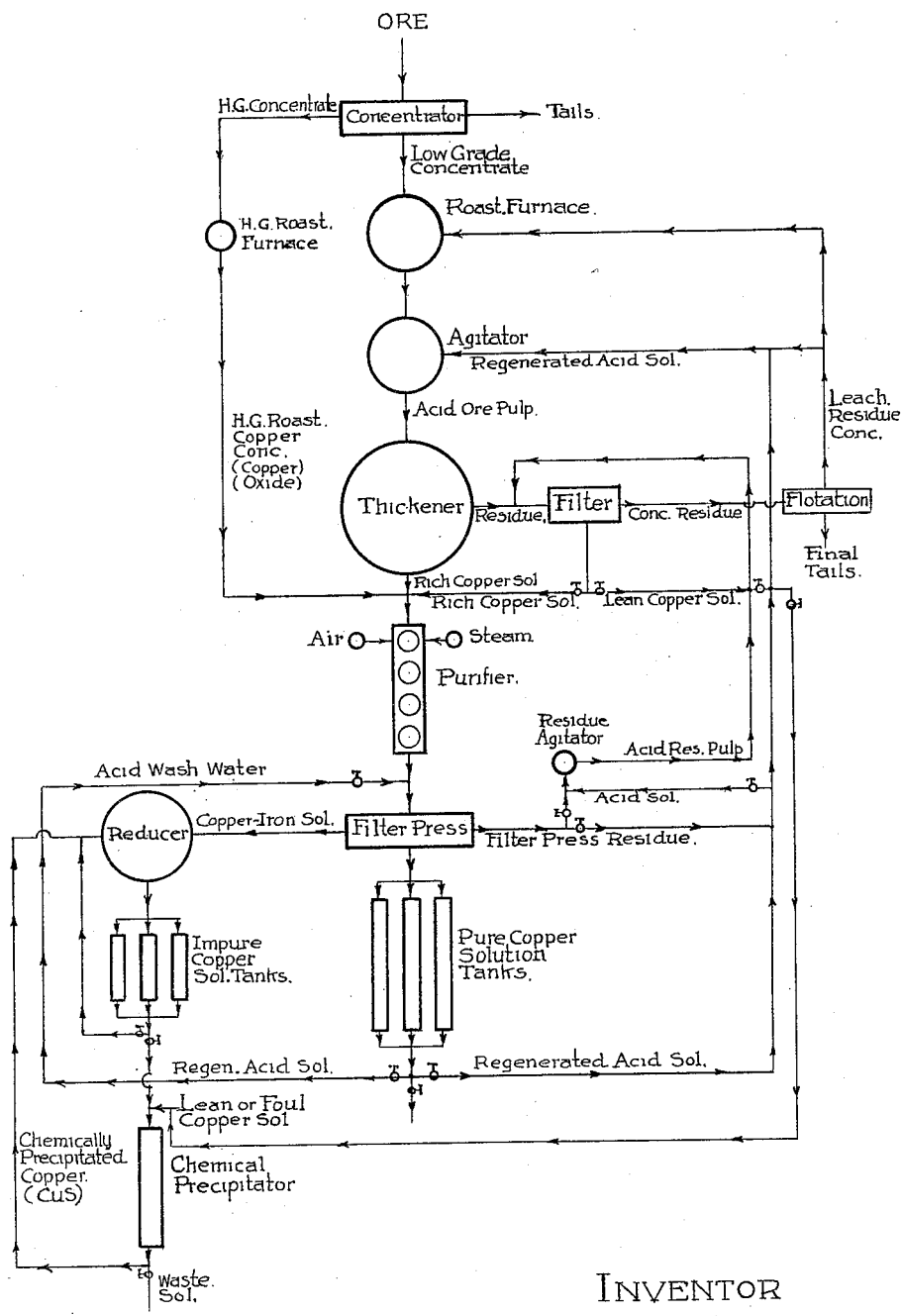
INVENTOR
William E. Greenawalt Patented June 7, 1932                                          1,862,343

UNITED STATES PATENT OFFICE

WILLIAM E. GREENAWALT, OF DENVER, COLORADO

COPPER EXTRACTION PROCESS

Application filed July 15, 1929. Serial No. 378,298.

The process is particularly applicable to the treatment of copper concentrate, obtained in any of the usual ways from the original ore, as by flotation or gravity concentration.

In the ordinary concentration of copper ore it will usually be practical to make a sulphide concentrate containing from 25% to 30% copper. If the ore contains some of the copper as chalcocite it is practical to obtain some of the concentrate containing as much as 50% or 60% copper, if a separation is made between the chalcocite and the other copper minerals.

The process will be described in reference to the treatment of sulphide concentrate. Reference may be made to the accompanying drawing which represents a flow sheet of the process in diagrammatic plan.

The ore, as mined, is treated in the usual way to obtain a sulphide concentrate. It is preferred, for the purpose of this process, to separate a small portion of the highest grade concentrate from the general concentrate. If the ore contains some of the copper as chalcocite, this small portion of the high grade concentrate may contain as much as 60% to 70% or more copper.

The general concentrate is roasted, preferably with the object of making as much as possible of the copper water soluble and as much as possible also acid soluble. By roasting in that way a considerable amount of the iron in the concentrate will also be made soluble, especially in dilute acid, and if an attempt is made to render the iron practically insoluble, both the water soluble and the acid soluble copper are likely to be greatly reduced. Theoretically, it is possible, in roasting, to break up iron sulphate to make the iron insoluble, or practically so, without greatly reducing the solubility of the copper, but practically the operation is usually a failure and is attended with a great deal of difficulty and expense, as compared with the more simple roasting of obtaining the maximum copper solubility, irrespective of the iron solubility. While the details of roasting are not essential to the process, it will be assumed that the concentrate is roasted to give the highest copper extraction, without particular attention to the solubility of the iron or other impurities.

The roasted concentrate is then leached with a dilute acid solution, preferably by agitation, to extract the copper. Some iron and other impurities, such as alumina, arsenic, antimony, etc., will also be dissolved, if present. The roasted concentrate is leached by agitation with the dilute acid solution to get the highest practical extraction of the copper. It is desirable not to have a greater excess of acid at the completion of the leaching by agitation than is necessary to get the desired extraction.

The acid ore pulp flows from the agitator to the thickener, where most of the acid copper solution is separated from the leached residue. If, for example, the concentrate contains 30% extractable copper, and the copper solution contains 5% copper, in the treatment of one ton of concentrate, five tons of solution will be separated from the residue in the thickener, by decantation, and the residue, as a sludge containing one ton of solution, flows into the filter, where the remaining solution is separated from the residue by filtration and the residue washed. The rich copper solution from the filter is combined with that from the thickener, and flows into the purifier, where the solution is purified by precipitating out the soluble iron and other injurious impurities, such as alumina, arsenic, and antimony, if present in the concentrate, and dissolved with the dilute acid solution. It is well known that copper oxide, under certain conditions, acts as a strong base to precipitate iron and other impurities from copper solutions. The practicability of this step depends on how it is applied.

It is desirable that the copper oxide be in as concentrated a form as practical, and that it shall be in a fine state of sub-division. To get a suitable product for the purpose of purification, a high grade concentrate is separated from the general concentrate, and separately roasted in the high grade concentrate roasting furnace. The high grade concentrate, as obtained by flotation, will usually be fine enough for the purpose of purification of the solution, but if not, it is ground to the fineness desired, say 100 or 200 mesh, or finer. This roasted high grade concentrate is then introduced with the acid copper solution into the purifier. The solution is heated to about 80 deg. C. or 170 deg. F., preferably by the direct application of steam. The heated solution is then agitated in the presence of the roasted high grade copper concentrate, or copper oxide, and air. The copper oxide neutralizes the excess acid and then precipitates the iron and other impurities from the substantially neutral solution. At the end of the operation, as practically carried out, there will be some excess of the finely ground roasted high grade copper concentrate, but the amount will be relatively small. It should be noted that it will not be necessary to get a clear acid copper solution either from the thickener or from the filter, and thus no great refinement or expense will be necessary in that step of the process. The filtering of the acid copper leached residue, as a thickened sludge, can be cheaply carried out in a continuous mechanical filter of the rotary type, including the washing. The leached residue may be wasted, or, if it contains other recoverable values, such as gold or silver or lead, it may be given any further treatment desired.

The neutral copper solution, with the precipitate and excess roasted high grade copper concentrate flows from the purifier to the filter press, where the pure neutral copper solution is separated from the residue. This copper solution will be quite pure, and relatively free from iron and other impurities. The pure copper solution is then electrolyzed in the pure copper solution tanks to deposit the copper and regenerate acid. On account of the high purity of the copper solution, very pure copper cathodes are obtained, and with a very high ampere efficiency. Most of the copper extracted—probably from 90% to 95%—will be directly recovered in this way. A portion of the regenerated acid solution is returned to the agitator to treat fresh roasted concentrate but on account of the high percentage of water soluble copper in the roasted concentrate, the amount of regenerated acid solution necessary to dissolve the acid soluble copper, will be small.

The insoluble residue in the filter press will consist of precipitated impurities, mostly iron, and the excess of roasted high grade copper concentrate or copper oxide used to purify the copper solution. The precipitated impurities are easily and quickly re-dissolved with dilute acid solution. It is desirable that this impure copper solution obtained from re-dissolving the precipitated impurities, should not be highly acid in order to effectively precipitate the copper from the impure solution. If the copper is chemically precipitated, as with metallic iron, excess acidity must first be neutralized at the expense of the iron before the copper is precipitated. If the copper, or a portion of it, is electrolytically precipitated from a solution containing salts of iron, ferric iron is simultaneously produced with the precipitation of the copper, and this ferric iron, which is harmful in the electrolyte, can be easily reduced by any of the ordinary methods in a neutral or slightly acid solution, whereas it is with great difficulty reduced in a highly acid solution.

The impure copper solution, usually containing principally soluble iron, flows into the reducer, and from there through the impure copper solution tanks, where copper is deposited and acid and ferric iron are regenerated. A portion of the electrolyzed solution is returned to the reducer. Another portion flows into the chemical precipitator, where the copper is precipitated with any of the usual precipitants, such as metallic iron or hydrogen sulphide. Any lean or foul copper solutions obtained as a by-product of the process or from other sources may be precipitated in the chemical precipitator. The chemically precipitated copper, such as cement copper or copper sulphide, is introduced into the reducer, where the copper goes into solution by reacting with the ferric iron to convert it into the ferrous condition. The reduced solution is then again electrolyzed, and thus the copper of the impure solution as also the copper which is chemically precipitated, is converted into the relatively pure electrolytic metal.

On account of the ease with which the precipitated impurities are re-dissolved in an acid solution, the insoluble residue in the filter press may be washed with dilute acid, and this step may be cheaply carried out in this way in the filter press. There need not be any clear division in the steps, because, after the pure copper solution is filtered from the insoluble residue in the filter press, the mixing of the copper solutions to a small degree will not make much, if any, difference.

Ordinarily, the insoluble residue from the filter press, consisting mostly of excess of copper concentrate or copper oxide, will be added to the roasted low grade concentrate and leached with it. In this way the insoluble residue may be eliminated with the leached concentrate residue, after the copper is sufficiently extracted. This also offers a cheap and effective method of precipitating the impurities in the copper solution with an excess of the concentrated copper oxide, because the copper which is not extracted from the concentrated copper oxide in the purification of the acid copper solution, will be extracted, in the regular operation of the process, in the agitator, in the treatment of the mixture of new roasted concentrate and insoluble concentrated copper oxide residue.

If the insoluble residue from the filter press contains a large amount of acid soluble impurities which might accumulate in the copper leach solution, it will be desirable to leach the excess copper from the insoluble residue, in the residue agitator, with regenerated acid solution, and filter the acid residue pulp with the leached concentrate residue, and thus eliminate it from the leaching circuit.

The relatively pure wash water, either from washing the leached concentrate residue or the insoluble residue after purification of the solution, may be used as a dilutant for the regenerated acid solution for leaching the roasted concentrate.

By leaching the roasted concentrate with an excess of acid solution, both the water soluble and the acid soluble copper can be closely extracted. If an attempt were made to leach the roasted copper concentrate to get a satisfactory extraction while at the same time attempting to neutralize the acid and precipitate soluble impurities, the attempt would probably result in failure. Similarly, if an attempt were made to so adjust the purification of the copper solution so as to precipitate all or nearly all of the impurities while at the same time consuming all or nearly all of the the high grade roasted copper concentrate or concentrated copper oxide, the process would be too delicate for practical operation.

The percentage of extraction of the copper from ore by leaching depends largely on the amount of sulphur, as sulphide, in the ore. If the material to be leached is roasted concentrate the extraction will depend largely on the amount of sulphide sulphur and the amount of ferrite and ferrate in the roasted concentrate. To facilitate the operation of the process, and permit of some latitude in its application, it will usually be preferable to subject the acid leached ore or low grade concentrate residue to concentration, such as flotation, and adding the resulting leached residue concentrate to new ore or low grade concentrate, either in the agitator or in the roasting furnace, to be further leached with the regenerated acid solution to get a very high ultimate extraction of the copper.

In the preferred method of carrying out the process, as described, the leached concentrate residue can be cheaply separated from the acid copper solution, because a clear solution is not necessary in this step of the process. The separation can be made to get the best general results for simplicity and cheapness. If, for example, it is desired to quickly and cheaply filter the thickened acid sludge, a considerable portion of the extreme fines may overflow, or be decanted, with the solution from the thickener, and the final separation between the copper solution and the fines and precipitated impurities can be made to advantage in the filter press.

This process may be considered as an improvement, or modification, of that described in my pending application, Serial No. 147,324, filed November 9, 1926.

I claim:

1. A process comprising, treating copper ore with acid solution in excess to extract the copper, applying finely divided copper oxide in excess to the acid copper solution to neutralize the acid and precipitate soluble impurities, separating the resulting pure copper solution from the insoluble residue, electrolyzing the pure copper solution to deposit the copper and regenerate acid, re-dissolving the impure precipitate with an acid solution, separating the resulting impure copper solution from the insoluble residue and separately precipitating the copper therefrom, and applying regenerated acid solution to the insoluble residue to dissolve the copper of the excess copper oxide 2. A process comprising, treating copper ore with an acid solution in excess to extract the copper, applying finely divided copper oxide in excess to the acid copper solution to neutralize the acid and precipitate soluble impurities, separating the resulting pure copper solution from the insoluble residue, electrolyzing the pure copper solution to deposit the copper and regenerate acid, re-dissolving the precipitated impurities with regenerated acid solution, and separately electrolyzing the resulting impure copper solution to deposit the copper.

3. A process comprising, treating copper ore with an acid solution in excess to dissolve the copper, applying finely divided copper oxide in excess to the acid copper solution to neutralize the acid and precipitate soluble impurities, separating the resulting pure copper solution from the insoluble residue, electrolyzing the pure copper solution to deposit the copper and regenerate acid, re-dissolving the precipitated impurities with regenerated acid solution, separating the resulting impure copper solution from the insoluble residue, separately electrolyzing the resulting impure copper solution containing salts of iron to deposit the copper and regenerate ferric iron, chemically precipitating copper from lean or foul solutions, applying the chemically precipitated copper to the electrolyzed impure copper solution to reduce ferric iron to the ferrous condition, and again electrolyzing the solution.

4. A process comprising, roasting copper concentrate, leaching a portion of the concentrate with an excess of acid solution to extract the copper, separating the resulting copper solution from the leached concentrate residue, then applying another portion of the roasted concentrate containing copper oxide in excess to the acid copper solution to precipitate soluble impurities, separating the resulting pure copper solution from the insoluble residue, electrolyzing the resulting pure copper solution to deposit the copper and regenerate acid, separating the precipitated impurities from the insoluble residue, and extracting the copper in the residue with acid solution.

5. A process comprising, roasting copper concentrate, leaching a portion of the roasted concentrate with an excess of acid solution to extract the copper, separating the resulting copper solution from the leached concentrate residue, then applying another portion of the roasted concentrate containing copper oxide in excess to the acid copper solution to precipitate soluble impurities, separating the resulting pure copper solution from the insoluble residue, electrolyzing the resulting pure copper solution to deposit the copper and regenerate acid, re-dissolving the precipitated impurities from the insoluble residue, and extracting the copper in the insoluble residue with regenerated acid solution.

6. A process comprising, roasting copper concentrate, leaching a portion of the roasted concentrate with an excess of acid solution to extract the copper, separating the resulting copper solution from the leached concentrate residue, then applying another portion of the roasted concentrate containing copper oxide in excess to the acid copper solution to precipitate soluble impurities, separating the resulting pure copper solution from the insoluble residue, electrolyzing the resulting pure copper solution to deposit the copper and regenerate acid, re-dissolving the precipitated impurities from the insoluble residue, adding the insoluble residue to new concentrate to be leached, and leaching the mixture with regenerated acid solution.

7. A process comprising, treating copper ore with an excess of acid solution to extract the copper, separating the resulting copper solution from the leached ore residue, applying concentrated copper oxide ore in excess to the acid copper solution to precipitate impurities, separating the resulting pure copper solution from the insoluble residue, electrolyzing the pure copper solution to deposit the copper and regenerate acid, separating the precipitated impurities from the insoluble residue, adding the insoluble residue to new ore and leaching the mixture with regenerated acid solution.

8. A process comprising, treating copper ore to separate a high grade and a low grade concentrate, separately roasting the high grade and the low grade concentrate, leaching the roasted low grade concentrate with an excess of acid solution to extract the copper, separating the resulting copper solution from the leached residue, then applying the roasted high grade concentrate containing copper oxide in excess to the acid copper solution to precipitate soluble impurities, separating the resulting pure copper solution from the insoluble residue, electrolyzing the pure copper solution to deposit the copper and regenerate acid, re-dissolving the precipitated impurities from the insoluble residue with regenerated acid solution, and leaching the insoluble residue with regenerated acid solution.

9. A process comprising, treating copper ore to separate a high grade and a low grade copper concentrate, separately roasting the high grade and the low grade concentrate, leaching the roasted low grade concentrate with an excess of acid solution to extract the copper, applying the roasted high grade concentrate containing copper oxide in excess to the acid copper solution to precipitate soluble impurities, separating the resulting pure copper solution from the insoluble residue, electrolyzing the pure copper solution to deposit the copper and regenerate acid, removing the precipitated impurities from the insoluble residue and adding the insoluble residue to new low grade concentrate and leaching the mixture with regenerated acid solution.

10. A process comprising, roasting copper concentrate, leaching a portion of the roasted concentrate with an excess of acid solution to extract the copper, applying another portion of the roasted copper concentrate containing copper oxide to the resulting impure copper solution containing soluble iron to precipitate the iron, separating the resulting pure copper solution from the insoluble residue, electrolyzing the pure copper solution to deposit the copper and regenerate acid, applying regenerated acid solution to the insoluble residue to dissolve the precipitated iron, separately electrolyzing the resulting copper solution containing salts of iron to deposit the copper and regenerate acid and ferric iron, chemically precipitating copper from lean or foul solution, applying the chemically precipitated copper to the electrolyzed copper solution containing ferric iron to reduce the iron from the ferric to the ferrous condition, and again electrolyzing the solution.

11. A process comprising, treating copper ore to separate a high grade and a low grade concentrate, separately roasting the high grade and the low grade concentrate, leaching the roasted low grade concentrate with an excess of acid solution to extract the copper, then applying the roasted high grade concentrate containing copper oxide in excess to the acid copper solution to precipitate dissolved impurities, separating the resulting pure copper solution from the insoluble residue, electrolyzing the pure copper solution to deposit the copper and regenerate acid, applying regenerated acid solution to the insoluble residue to dissolve remaining copper and soluble impurities, and separately electrolyzing the impure copper solution to deposit the copper.

12. A process comprising, leaching copper ore with acid solution in excess to extract the copper, separating the copper solution from the leached residue, treating the copper solution to precipitate iron dissolved with the copper, separating the purified copper solution from the insoluble residue, electrolyzing the purified copper solution to deposit the copper and regenerate acid, applying the regenerated acid solution to the insoluble residue to dissolve residual copper and acid soluble iron, and separately electrolyzing the resulting impure copper solution containing salts of iron to deposit the copper.

13. In the purification of leach copper solution containing salts of iron, the process comprising adding an excess of copper oxide to the solution to precipitate iron and other impurities, separating the resulting purified copper solution from the insoluble residue, electrolyzing the solution to deposit the copper and regenerate acid, adding acid solution to the insoluble residue to re-dissolve precipitated iron and other impurities, separating the resulting impure copper solution from the resulting insoluble residue, and then applying acid solution to dissolve the excess of copper oxide from the insoluble residue.

14. A process comprising leaching copper ore with excess acid solution to extract the acid soluble copper, then adding finely divided copper oxide in excess to the acid copper solution to neutralize the solution and precipitate dissolved iron, separating the resulting pure copper solution from the residue, electrolyzing the solution to deposit the copper and regenerate acid, applying the regenerated acid solution in excess to the residue to dissolve the precipitated iron and the excess of finely divided copper oxide, separating the resulting impure copper solution from the insoluble residue, separately electrolyzing the impure copper solution to deposit the copper, and wasting the impoverished impure solution.

WILLIAM E. GREENAWALT.